Sept. 2, 1941.  F. C. BEST  2,254,261
MOTOR VEHICLE
Filed June 7, 1939
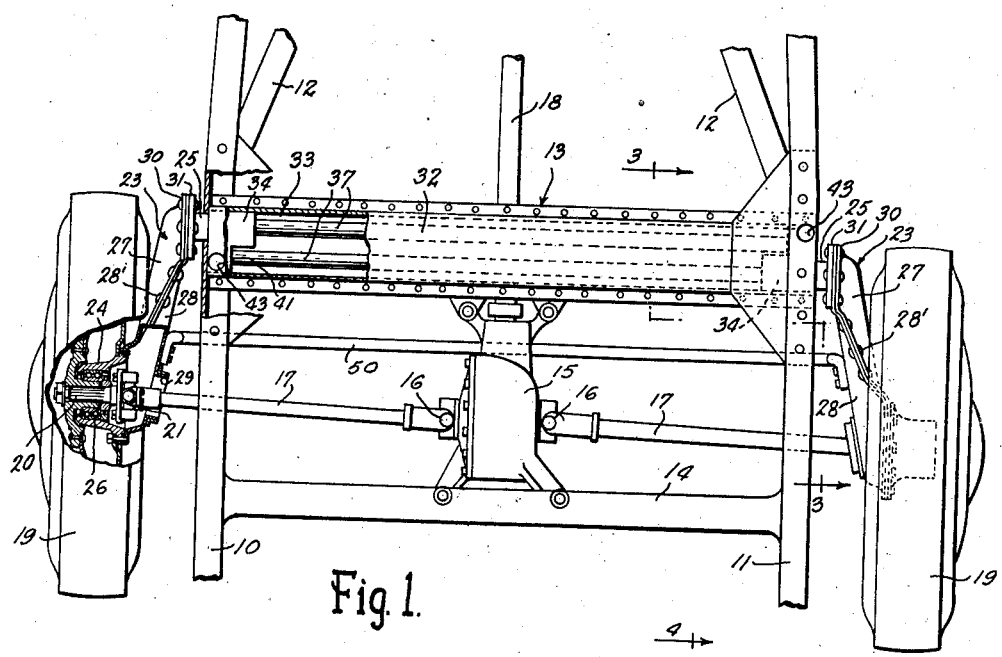
Fig. 1.
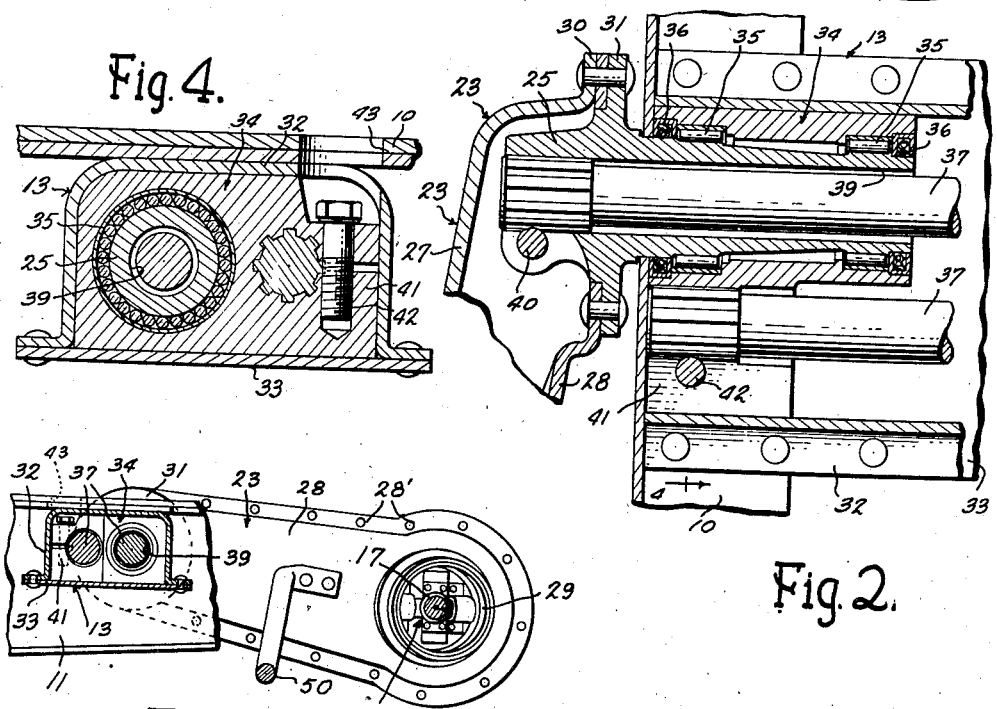
Fig. 4.
Fig. 2.
Fig. 3.
INVENTOR.
Frank C. Best
BY
Sibbetts & Hart
ATTORNEYS Patented Sept. 2, 1941

2,254,261

UNITED STATES PATENT OFFICE 2,254,261

MOTOR VEHICLE

Frank C. Best, Detroit, Mich., assignor to Packard Motor Car Company, Detroit, Mich., a corporation of Michigan Application June 7, 1939, Serial No. 277,854

4 Claims. (Cl. 280—124)

This invention relates to motor vehicles and more particularly to wheel mounting and suspension.

An object of the invention is to provide a suspension system for motor vehicle wheels that is simple in design and adapted to be produced at low cost.

Another object of the invention is to provide a swinging lever type of driving wheel mounting for motor vehicles with a transverse torsion bar type of suspension arranged out of interfering relation with the propeller shaft of the driving mechanism.

Another object of the invention is to provide an independent mounting and suspension for the driving wheels of a motor vehicle that will allow the outer universal joints of the driving axles to be disposed close to the wheel center line to increase the efficiency of such joints because of the longer drive shafts.

A further object of the invention is to provide swinging lever type of mounting and transverse torsion bar suspension for motor vehicle wheels in which the torsion bars and the levers are in staggered relation to allow a similar lever construction and staggered wheel impacts.

Still another object of the invention is to provide a transverse torsion bar suspension for vehicle wheels that will have a maximum efficiency without interference with the normal location of the driving mechanism for the wheels.

Other objects of the invention will appear from the following description taken in connection with the drawing, which forms a part of the specification, and in which:

Fig. 1 is a plan view, partly broken away, of a motor vehicle chassis incorporating the invention;

Fig. 2 is a fragmentary sectional view of wheel mounting and suspension structure;

Fig. 3 is a sectional view taken on line 3—3 of Fig. 1;

Fig. 4 is a sectional view taken on line 4—4 of Fig. 2.

The wheel mounting and suspension mechanisms forming the subject matter of the invention are shown associated with the rear driving wheels of a motor vehicle, but such mechanisms can also be associated with the other wheels of the vehicle.

The vehicle frame comprises side members 10 and 11 joined together by diagonal members 12 and a plurality of cross members, as indicated at 13 and 14. Housing 15, suitably mounted on the cross members, contains conventional differential drive mechanism that is connected by universal joints 16 to the driving shafts 17. The usual propeller shaft is contained in the tube 18 and drives the differential mechanism. A pair of oppositely disposed driving wheels 19 is arranged one on each side of the frame and is splined to stub shafts 20 that are connected to the driving shafts by universal joints 21.

The wheels are supported by carriers each comprising a hollow arm 23, a bearing sleeve 24 and a spindle 25. The sleeves are suitably fixed to the lower ends of the arms and roller bearings 26 are arranged between the sleeves and the stub shafts. The wheels telescope the bearings and the universal joints 21 join the stub shafts with the driving shafts 17 partly within the sleeves and the arms 23. By thus locating the joints 21 close to the center line of the wheels long driving shafts can be utilized which increase the efficiency of the joints.

The hollow arms 23 are preferably fabricated from stampings consisting of sections 27 and 28 having mating flanges suitably fixed together as by rivets 28'. The sections 28 have openings 29 through which the driving shafts 17 project. The upper ends of the arms have flanges 30 that bound openings into which an end of the spindles 25 projects. The flanges 30 are riveted to flanges 31 on the spindles.

The frame cross member 13 is preferably utilized to carry the spindles and the suspension means, and it comprises two sections 32 and 33 fixed together to form a hollow casing adjacent the upper portion of the frame. Housings 34 are fixed in each end of the casing and the spindles project through openings in the housings, roller bearings 35 being arranged between the spindles and the housings. Suitable retainers 36 are provided at each end of the roller bearings to confine lubricant about the bearings.

The rotatably mounted carrier spindles have suspension means associated therewith in the form of a pair of torsion bars 37. These bars are staggered, one bar being in advance of the other, and preferably extend in the same horizontal plane across the frame. An opening 39 extends through the bearing portion of each spindle and the end within the wheel carrier arm is splined to engage the splined end of a bar that projects therethrough. The spindles are bifurcated at such outer splined ends and bolts 40 are utilized to clamp the spindles against the bars. Opposite ends of the two torsion bars are in this manner fixed to the spindles.

The housings 34 are formed with a projecting bifurcated portion 41 outside of the roller bearings, and such portions are formed with a splined opening for receiving the other splined ends of the torsion bars. Such ends of the bars are oppositely disposed and are retained fixed in the splined openings of the housings by clamp bolts 42. Suitable openings 43 are formed in the frame for engagement of bolts 42.

The carrier arms are fabricated from similar parts for economy of production and consequently the wheels will be staggered similarly to the torsion bars. Thus one wheel will be slightly in advance of the other and thus the universal joints are slightly out of alignment at their ends so that one wheel will take the shock before the other when striking a transverse rise in the road surface and thus the ride will be improved at such times and the life of the universal joints in the driving axle will be prolonged.

The upper section of the cross frame member 13 is fixed to the upper flange of the side frame members and the staggered relation of the torsion bars allows this cross member to be shallow so that the propeller shaft will have adequate clearance. The arrangement of the torsion bars entirely across the frame allows the use of stock having a relatively small diameter that will distort sufficiently to give a soft ride and at the same time have adequate strength.

In order to damp side roll of the vehicle the carriers are directly connected by a torsion bar 50. The ends of this bar are bent and attached by suitable means to the carrier arms.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, a frame, a pair of parallel torsion bars extending across the frame, one in advance of the other, means anchoring one end of said bars to the frame, means for rotatably mounting the other end of said bars on the frame, the rotatable ends and the anchored ends of the bars being relatively oppositely disposed, similar wheel carriers fixed to the free ends of the torsion bars, and wheels mounted on said carriers, said wheels being mounted one slightly in advance of the other due to the arrangement of the torsion bars and the similarity of the carriers whereby wheel impacts will be slightly staggered.

2. In a motor vehicle, a frame, a pair of torsion bars extending across the frame and being anchored at one end thereto, spindles fixed to the other ends of said bars, roller bearing means on the frame carrying said spindles, the anchored and bearing supported ends of the bars being oppositely disposed, a wheel carrier fixed to each spindle and a torsion bar directly connecting said carriers.

3. In a motor vehicle, a frame having side rails with flanges extending horizontally toward each other, a closed hollow casing extending across the frame and fixed under the horizontal flanges of the rails, split housings fixed in the ends of the casing beneath the rail flanges, torsion rods extending through the casing and the housings with one end of each rod in the split portion of the housings, a bolt engaging the split portion of each housing to clamp the rod end therein, the casing and rail flanges being open to admit insertion and removal of the bolts, and wheel carriers on opposite sides of the frame fixed one to each torsion rod.

4. In a motor vehicle, a frame having a pair of channel side rails with the open portions in facing relation, a closed hollow casing traversing the frame and secured at its ends in the open portion of the side rails, a housing in each end of the casing having a bearing portion and a clamping portion, a pair of torsion rods in the casing, one end of each rod extending through a bearing portion of one housing and the other end extending into a clamping portion of the other housing, means securing the housings in clamping relation with the rod ends, and a wheel carrier fixed on each unclamped rod end.

FRANK C. BEST.

CERTIFICATE OF CORRECTION.

Patent No. 2,254,261.   September 2, 1941.

FRANK C. BEST.

It is hereby certified that error appears in the printed specification of the above numbered patent requiring correction as follows: Page 1, first column, line 51, for "side members 10" read --channel side members or rails 10--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.